(12) United States Patent
Acreman

(10) Patent No.: US 7,624,677 B2
(45) Date of Patent: Dec. 1, 2009

(54) APPARATUS FOR PREPARING CURD AND FOR FEEDING THE PREPARED CURD TO A CURD PROCESSING APPARATUS

(75) Inventor: Steven Acreman, Wayford Crewkerne (GB)

(73) Assignee: Tetra Laval Holding & Finance S.A., Pully (CH)

( * ) Notice: Subject to any disclaimer, the term of this patent is extended or adjusted under 35 U.S.C. 154(b) by 511 days.

(21) Appl. No.: 11/147,536

(22) Filed: Jun. 8, 2005

(65) Prior Publication Data

US 2005/0274264 A1 Dec. 15, 2005

(30) Foreign Application Priority Data

Jun. 10, 2004 (NL) .................................. 1026381

(51) Int. Cl.
*A47J 25/00* (2006.01)
(52) U.S. Cl. .............................. 99/456; 99/458; 99/465
(58) Field of Classification Search ........... 99/452–466, 99/348, 516, 534
See application file for complete search history.

(56) References Cited

U.S. PATENT DOCUMENTS

| 3,465,439 A | | 9/1969 | Wakeman et al. |
| 3,645,751 A | * | 2/1972 | Wakeman .................... 426/582 |
| 3,653,919 A | * | 4/1972 | Giddey et al. .................. 426/38 |
| 3,683,500 A | * | 8/1972 | Latapy ......................... 99/458 |
| 4,750,415 A | * | 6/1988 | Ostemar ....................... 99/458 |
| 5,356,640 A | | 10/1994 | Jameson et al. |
| 5,863,579 A | * | 1/1999 | Muzzarelli .................. 426/231 |
| 6,465,033 B2 | * | 10/2002 | Menninga et al. ........... 426/512 |
| 6,705,212 B2 | * | 3/2004 | van der Meulen et al. ..... 99/456 |
| 2002/0096057 A1 | | 7/2002 | Sipma et al. |

FOREIGN PATENT DOCUMENTS

| DE | 68 05 422 U | 4/1969 |
| EP | 0 133 587 A | 2/1985 |
| WO | WO 94/22293 A1 | 10/1994 |

OTHER PUBLICATIONS

PCT International Search Report dated Sep. 16, 2005.
"Tetra Tebel OST Horizontal tank for curd making", Tetra Pak Tebel, Leeuwarden, The Netherlands, 2000.

* cited by examiner

*Primary Examiner*—Timothy F. Simone
(74) *Attorney, Agent, or Firm*—Quarles & Brady LLP

(57) ABSTRACT

An apparatus for preparing curd and feeding same to a curd processing apparatus, comprising a number of curd tanks and a pipe system connected with the curd tanks and provided with pumping means to feed curd from the curd tanks to the curd processing apparatus, wherein at least a number of curd tanks are provided with a first outlet and a second outlet, the pumping means being connected with the two outlets of said curd tanks, such that a curd tank can be pumped out via both outlets simultaneously.

9 Claims, 4 Drawing Sheets

APPARATUS FOR PREPARING CURD AND FOR FEEDING THE PREPARED CURD TO A CURD PROCESSING APPARATUS

CROSS REFERENCES TO RELATED APPLICATIONS

This application claims the priority benefit of Dutch Patent Application No. NL 1026381 filed on Jun. 10, 2004.

STATEMENT REGARDING FEDERALLY SPONSORED RESEARCH

Not applicable.

BACKGROUND OF THE INVENTION

The invention relates to an apparatus for preparing curd and feeding same to a curd processing apparatus, comprising a number of curd tanks and a pipe system connected with the curd tanks and provided with pumping means to feed curd from the curd tanks to the curd processing apparatus.

Such an apparatus is known from practice. The known apparatus comprises a number of curd tanks, also referred to as curd vats, cheese vats or cheese tanks, in which, in a known manner, through addition of starter and rennet to milk, a whey/curd mixture is prepared. By stirring and cutting with cutting frames present in the curd tanks, whey is released from the curd. The whey can at least partly be removed from the curd tank. The remaining whey/curd mixture is supplied to a curd processing apparatus via suitable piping and with suitable pumping means. Such curd tanks are for instance commercially available under the name of Tetra Tebel OST tank. An example of a curd processing apparatus is the cheddar machine available under the name of Tetra Tebel Alfomatic, which can be used, for instance, for producing cheese of the Cheddar type or the Pasta Filata type.

Known from practice is an apparatus which comprises a relatively large number of curd tanks, for instance 10 to 14 curd tanks, which are arranged in two rows opposite each other. Each curd tank has a curd discharge pipe, provided with a curd valve, which terminates in a ring line extending along all curd tanks, which ring line is coupled at one end, via two curd pumps, with an inlet section of a curd processing apparatus.

A problem of the known apparatus is that the curd vats in fact function batchwise, whereas other machines that are used in the cheese production process, such as the pasteurizer mostly used prior to the curd tanks, and the curd processing apparatuses following curd preparation, such as, for instance, a cheddar machine, a salt feeder, a block former and the like, perform a continuous process. This difference in functioning does not promote the uniformity and consistency of the curd treatment necessary to obtain an end product of high quality.

In practice, the pump-out (draining) time for a curd tank can vary considerably. Thus, for instance, pump-out times of the order of 15 to 20 minutes occur, but also pump-out times of the order of 50 minutes. This has consequences for the acidity and the moisture content of the curd. Curd particles that are pumped out of a vat last are smaller and have a higher acidity than the curd particles that are pumped out of a curd vat at the beginning of a pumping cycle. Also, the curd particles at the end of a pumping cycle have a lower moisture content than the curd particles pumped out of a curd vat at the beginning of a pumping cycle. The moisture content in turn has an influence on the effect of the operation of the salt feeder, which is to feed dry salt to the curd in the curd processing apparatus. Since the salt stops bacteriological activity, the salt supply is very important for the maturing process of the cheese produced. The composition of the eventual product depends on the composition of the curd at the time when the salt is being added and also on the accuracy of salt metering. Accordingly, it is important that the pump-out time of a curd vat be kept as short as possible in order to obtain a curd quality as constant as possible. Furthermore of interest is that through a shortening of the pump-out time, also a larger processing capacity of the apparatus is obtained. It is also important that the curd be fed uniformly to the curd processing apparatus.

A shortening of the pump-out time of a curd vat and a uniform curd supply to a curd processing apparatus can be effected by increasing the pumping capacity. However, there are limitations to this in that the speed of movement of the curd in the pipe system must remain below a particular limit to prevent damage to the curd structure. The speed of movement of the curd in a particular plant can be lowered by choosing the diameter of the piping to be larger. However, this has various inherent drawbacks. First of all, valves for pipes of a large diameter, for instance 6 inches, are difficult to obtain in many parts of the world. Also, such valves are very costly and not quickly operable.

In addition, to clean piping, a particular minimum flow velocity of the cleaning liquid is required. Accordingly, with pipes having a large diameter, actually an extra high pumping capacity is required for the cleaning liquid. The required flow of the cleaning liquid with 6-inch pipes, for instance, is more than twice as high as with 4-inch pipes.

SUMMARY OF THE INVENTION

One object of the invention is to obviate the above-outlined problems and more generally to provide an apparatus for preparing curd and feeding curd to a curd processing apparatus, whereby the pump-out time of a curd tank is as short as possible without the curd structure being damaged due to an unduly high speed of movement and/or acceleration. To that end, an apparatus of the above-described type is characterized in that at least a number of curd tanks are provided with a first outlet and a second outlet, the pumping means being connected with the two outlets of these curd tanks, such that a curd tank can be pumped out via both outlets simultaneously.

Another object of the invention is to provide an apparatus of the above-described type with which the curd coming out of the curd tanks is fed as uniformly as possible to the curd processing apparatus.

DESCRIPTION OF THE DRAWINGS

In the following, the invention will be described in more detail with reference to the accompanying drawing of an exemplary embodiment.

GENERAL DESCRIPTION OF THE INVENTION

Figure 1:
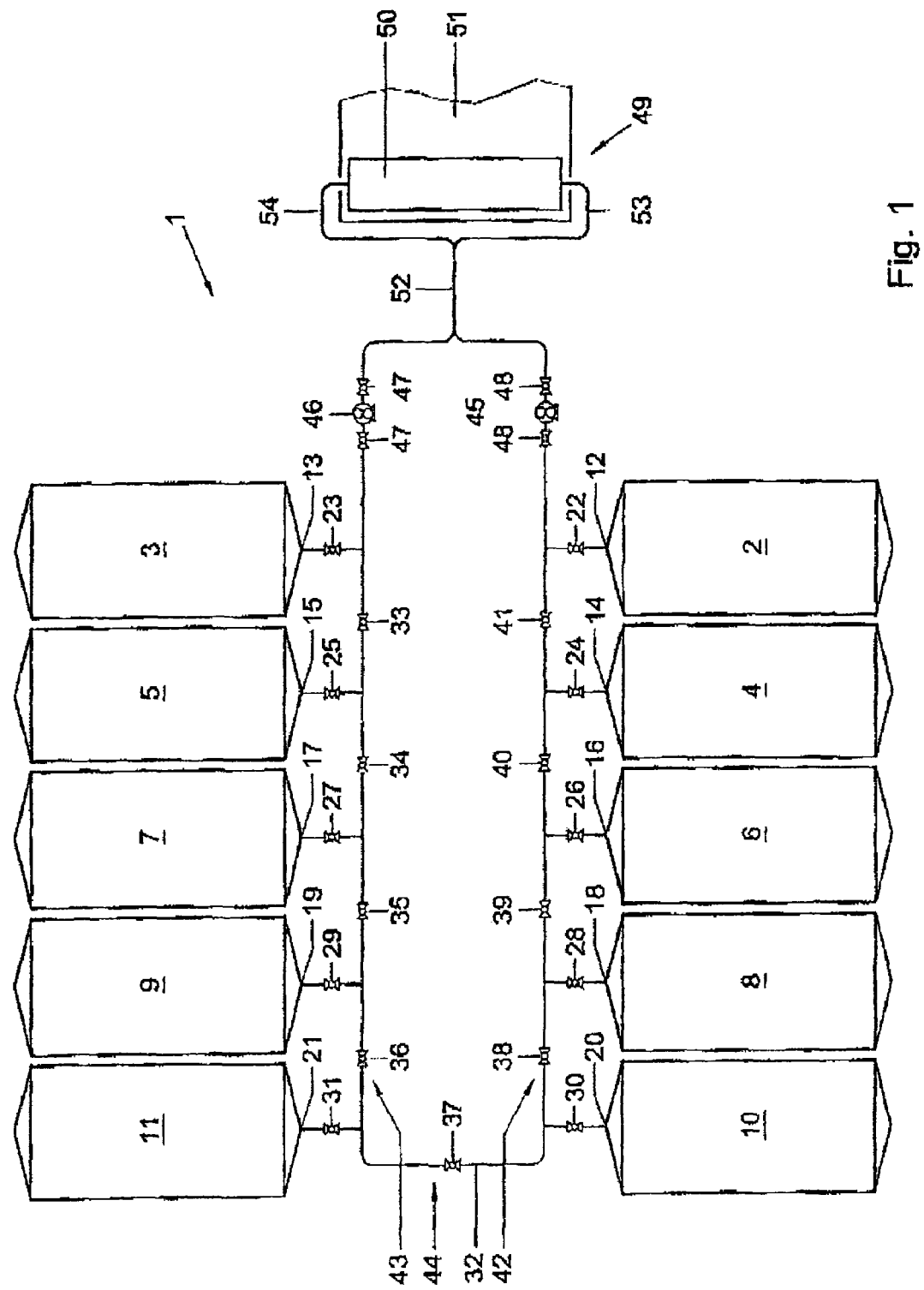
FIG. 1 shows schematically in top plan view an example of a known curd making apparatus.

FIG. 1 shows schematically in top plan view an example of a known curd making apparatus with ten curd tanks 2 to 11, which in this example are arranged opposite each other in two rows of five tanks. Via a pipe system, the curd tanks are connected with each other and with a curd processing apparatus. In the example shown, the curd tanks are of the Tetra Tebel OST tank type with a substantially cylindrical jacket and conically shaped end shields, which tanks in this example are disposed in a horizontal position, that is, the longitudinal axis of the jacket has a horizontal orientation, or an orientation not strongly deviating therefrom.

Each curd tank has a curd outlet 12 to 21 which in this example is situated at one of the ends of the tank and which is connected via a curd valve 22 to 31 to a ring line 32. In the respective sections situated between two curd outlets, the ring line is provided with a blocking valve 33 to 41. The ring line in fact comprises two sections 42, 43 which each extend along a row of curd tanks and which are connected with each other, near one of the ends of the two sections, via an end section 44, comprising the blocking valve 37. The other ends of the two sections are each connected via a curd pump 45, 46 with a curd processing apparatus 49. The pumps 45, 46 in turn are each included on opposite sides in the pipe system via coupling valves 47, 48.

The curd processing apparatus can for instance be a cheddar machine of the type Alfomatic with an inlet sieve 50 and a conveyor belt system, of which the beginning of a first conveyor belt 51 is visible. For a uniform distribution of the supplied curd across the width of the curd sieve and the conveyor belt, the curd pumps 45, 46 are coupled via a common discharge pipe section 52 and 53, 54, to opposite sides of the inlet sieve 50.

The curd tanks 2 to 11 are pumped out in succession by means of at least one of the curd pumps 45, 46. To that end, the curd valves, the blocking valves and the coupling valves are operated such that the correct valves are open and closed, respectively, to enable a selected curd tank to be pumped out. For instance, to pump curd from curd tank 5 to the curd processing apparatus 49, the coupling valves 47, the blocking valve 33 and the curd valve 15 are to be opened. The other valves can then be closed. If desired, both curd pumps can be set into operation simultaneously to pump out a curd vat. In that case, all blocking valves may be opened, as well as all coupling valves. For controlling the valves and the pumps, suitable valve control means and suitable pump control means can be present. As already indicated above, the known apparatus shown has a few inherent drawbacks, which are connected inter alia with the time needed to pump out a curd tank.

Figure 2:
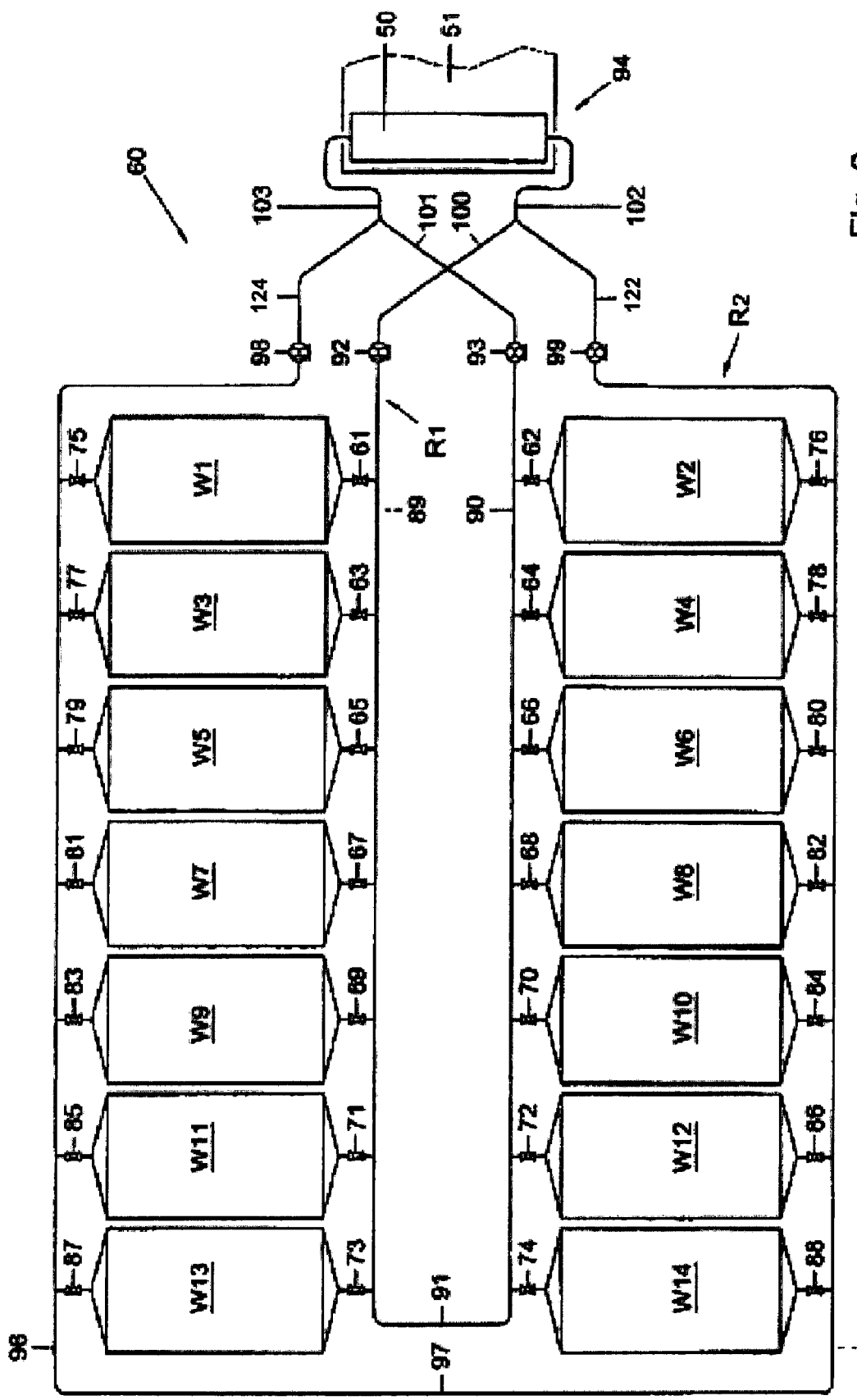
FIG. 2 shows schematically in top plan view an example of a curd making apparatus according to the invention.

FIG. 2 shows schematically an example of an apparatus 60 according to the invention. The apparatus 60 shown comprises fourteen curd tanks W1 to W14 which can be, for instance, of the Tetra Tebel OST tank type, but also of a different type, and which in this example are arranged similarly to the tanks in FIG. 1, in two rows of seven opposed tanks each. An example of a curd tank for use in an apparatus according to the invention is shown schematically in FIG. 6.

The tanks (FIG. 2), as in the example of FIG. 1, each have at the mutually facing ends an outlet combination 61 to 74 comprising an outlet provided with a curd valve, which outlet is connected with a first ring line R1. The ring line R1 in this example, as in the example of FIG. 1, has two sections 89, 90 which each extend along a row of curd tanks and which at one end are connected with each other through an end section 91 and at the other end are each connected via a curd pump 92, 93 with a curd processing apparatus 94.

The curd tanks are furthermore each provided with a second outlet combination 75 to 88, which comprises an outlet and a curd valve and which in this example is situated at the end of a curd tank situated opposite the first outlet. However, the outlet combinations of a curd tank may also be positioned differently, not at mutually opposite ends but, for instance, next to each other. The second outlet combinations are connected with a second ring line R2, which in the configuration shown is also referred to as outer ring line, because this ring line extends on the outside around the tanks. The first ring line R1 is also referred to as inner ring line.

The outer ring line, like the inner ring line, has two sections 95, 96, extending along the tanks, and an end section 97. At its end remote from the end section, each section 95, 96 is connected via a curd pump 98, 99 with the curd processing apparatus 94. The curd pumps 92, 93 and 98, 99, respectively, can again, if desired, be included in the pipe system via coupling valves. In FIG. 2 such coupling valves are not shown for clarity of the drawings. The curd pumps 92, 93 of the inner ring line RI in this example are connected crosswise with the opposite sides of the inlet sieve 50 via discharge pipe sections 100, 101, each terminating in a respective common discharge pipe section 102, 103, in which also terminates a respective discharge pipe section 122, 124 connected with the respective curd pumps 99, 98.

In operation now each tank can be pumped out via the two, in this example opposed, outlet combinations and the associated ring lines. This configuration makes it possible to pump out a curd tank in a short time without the curd speed getting so high that damage to the curd structure may arise and without necessitating pipes of a diameter so great that normally available standard valves and the like can no longer be used. Accordingly, using two pumps, each vat can be pumped out via the first and the second outlet simultaneously. A major advantage of the use of two outlets per tank is that even without modification of the dimensions of the valves and pipes used, a greater processing capacity is created.

Figure 3:
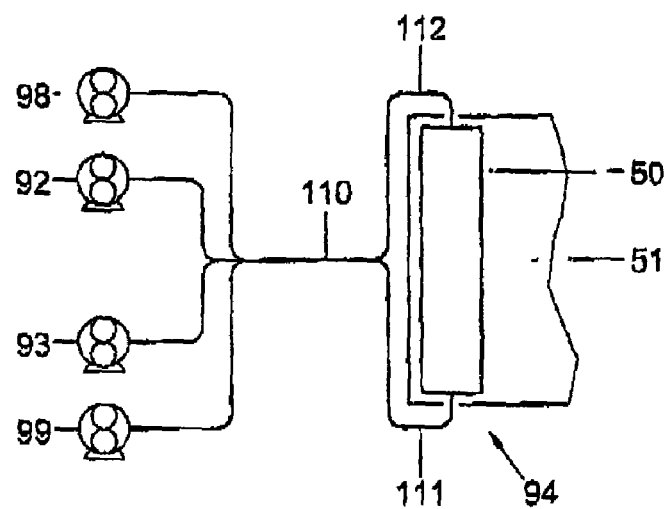
FIG. 3 shows schematically a variant of a part of the apparatus of FIG. 2.

As is indicated in FIG. 2, preferably at least four curd pumps are used, i.e. two curd pumps 92, 93 which are connected with the inner ring line RI and two curd pumps 98, 99 which are connected with the outer ring line R2. In the exemplary embodiment of FIG. 2, the two curd pumps connected with the inner ring line are coupled crosswise with the curd processing apparatus. FIG. 3 shows an example of an alternative configuration in which the four curd pumps 92, 93, 98, 99 are all connected with a common pipe section, which in turn splits into two pipe sections 111, 112, which terminate on opposite sides of the curd processing apparatus 94.

Figure 4:
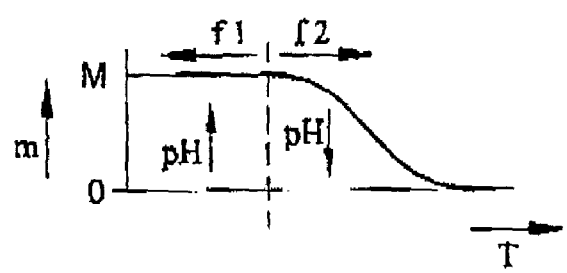
FIG. 4 shows schematically an example of a pump-out characteristic for a single curd vat.

When pumping out a curd tank, after some time the curd flow decreases, whereby initially curd particles with a relatively high pH value and large dimensions predominate and in a later phase, in turn, small particles at a relatively low pH value are obtained. All this is represented schematically in FIG. 4. In FIG. 4, a pump-out cycle of a curd tank is shown, with the vertical axis plotting the curd mass flow m and the horizontal axis plotting time T. It has been assumed that the pumping speed remains constant. In the first phase f 1 after a preliminary phase, not shown, of the pump-out cycle, the curd mass flow m is at a maximum (value M). The pH is then relatively high and the curd particles are relatively large. In the last phase f 2, the curd mass flow gradually falls to zero. In that phase, the pH is on average lower and the curd particles are smaller than in the first phase.

Figure 5:
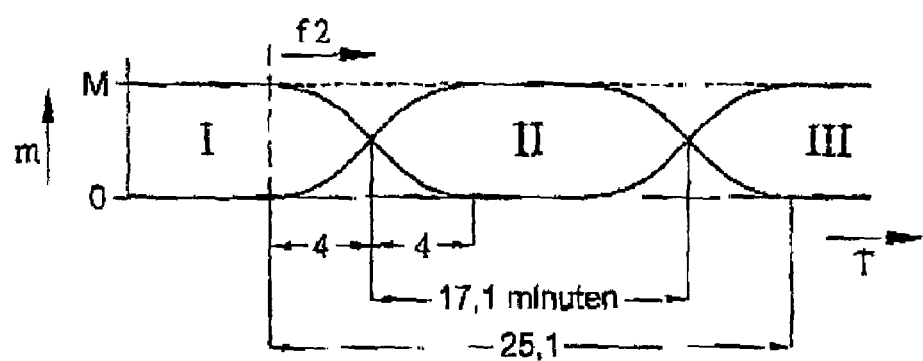
FIG. 5 shows schematically an example of a pump-out characteristic for an apparatus according to the invention.

By the use of four pumps, advantageously, during the last phase of the pump-out cycle of a first curd tank, pumping from a next tank can already be started. To that end, suitable pump control means, not shown, may be present. Such a procedure is shown schematically in FIG. 5. During the last phase of the pump-out cycle of tank I, to an increasing extent curd is already being pumped from tank II, so that the total curd mass flow remains substantially constant. The pump control means may be designed to determine the switch-on time of a pump, but also to control the pump speed, so that, if desired, during the overlapping phase, the pump speed for the second vat can be gradually raised. Also, in case of pump failure, the speed of the other pump(s) can be increased.

Similarly, in the last phase of the pump-out cycle of tank II, curd can already be pumped from tank III. In the example shown, the total pump-out cycle takes 25.1 minutes, while the overlap between successive cycles of two tanks is 8 minutes. During the overlap, the relatively high pH of the curd particles of the second tank at least partly compensates for the relatively low pH of the curd particles of the last phase of the pump-out cycle of the first tank. Also, the smaller dimensions of the curd particles in the last phase of a first tank are compensated for by the larger curd particles that are obtained in the initial phase of the next tank. In this way, both the quality and the mass flow of the curd supplied to the curd processing apparatus can be kept constant much better than in the case where no overlap of pump-out cycles is used.

It is noted that after the foregoing, various modifications will readily occur to those skilled in the art. For instance, the number of curd tanks can vary. Also, it is optionally possible to use additional curd pumps and/or more than one curd processing apparatus. Furthermore, the curd tanks are preferably disposed at an inclination, such that one outlet, for instance the outer outlet, is disposed higher than the other outlet. It is hereby promoted that the curd tanks can be properly pumped out.

Figure 6:
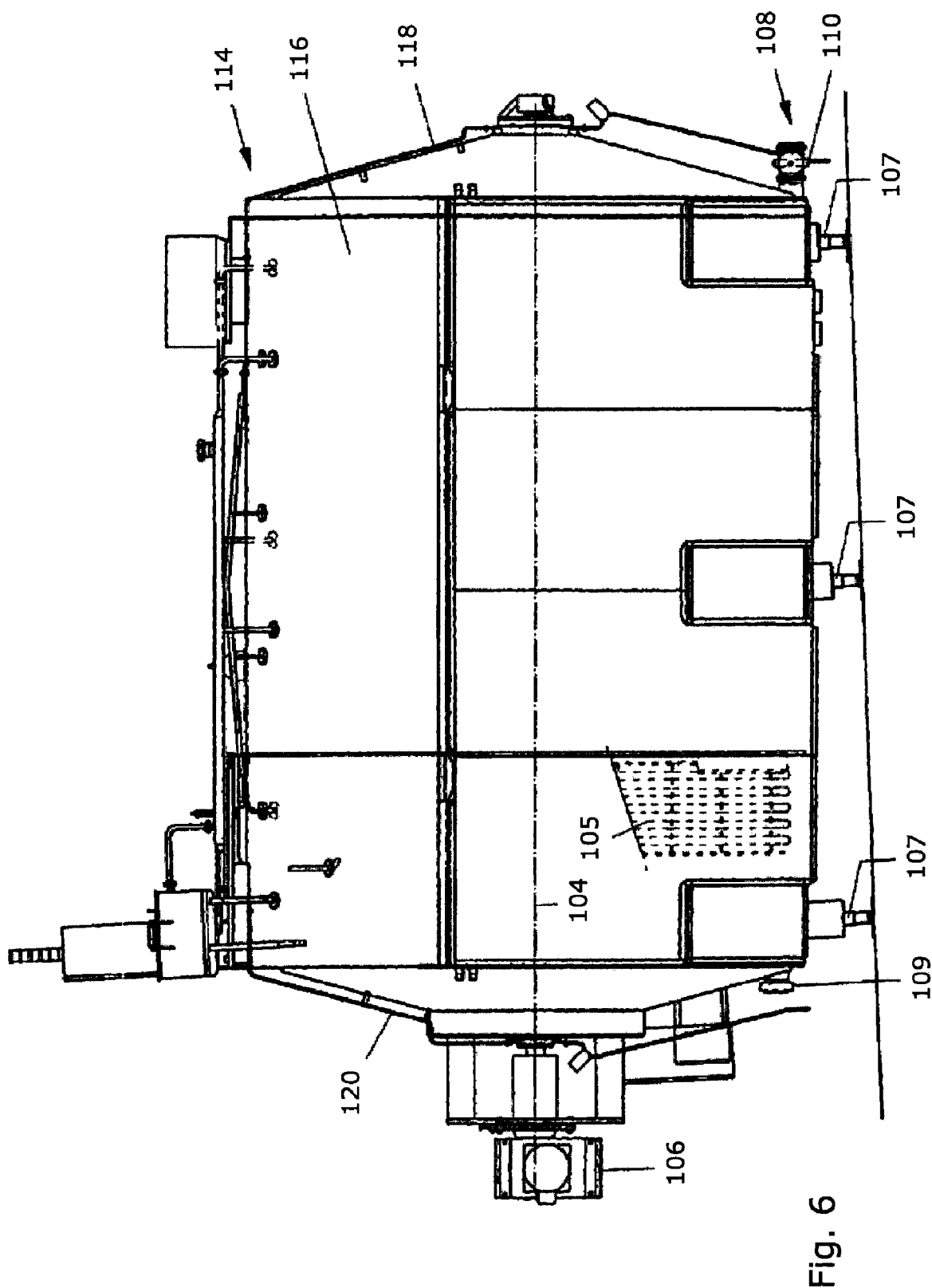
FIG. 6 shows schematically in side view an example of a curd tank for use in an apparatus according to the invention.

FIG. 6 shows schematically in side elevation an example of a curd tank 114 for use in an apparatus according to the invention. The curd tank shown is derived from a tank of the Tetra Tebel OST tank type. The tank shown has a substantially cylindrical jacket 116, which is disposed horizontally and which is sealed at both ends with conical end shields 118, 120. The end shields are conventionally provided with bearings, not shown, for a central shaft (indicated with an axis 104) which carries a number of cutting frames 105. Furthermore, a driving motor 106 is mounted on one of the ends of the shaft.

The tank is supported by supporting legs 107, which in this example are set such that one end of the tank is disposed slightly higher than the other end. Furthermore, the tank is provided with a first curd outlet 108 and a second curd outlet 109, which can be coupled with the ring lines R1 and R2 (FIG. 2). For the sake of completeness, in FIG. 6, at outlet 108 an associated curd valve 110 is shown as well. In the example shown, the outlets are situated at opposite ends of the tank, but this is not requisite.

It is noted that after the foregoing, various modifications of the described layout for the described curd tank will readily occur to those skilled in the art. Such modifications are understood to fall within the scope of the invention.

I claim:

1. An apparatus for preparing curd and feeding same to a curd processing apparatus, comprising a plurality of curd tanks and a pipe system connected with the curd tanks and provided with pumping means to feed curd from the curd tanks to the curd processing apparatus, wherein at least a number of said plurality of curd tanks are provided with a first outlet and a second outlet and wherein the pipe system comprises a first portion with associated pumping means, which first portion is connected with the first outlets of said curd tanks, and a second portion with associated pumping means, which second portion is connected with the second outlets of said curd tanks such that a curd tank can be pumped out via both outlets simultaneously.

2. An apparatus according to claim 1, wherein the first outlet and second outlet of at least one of the curd tanks are situated at opposite ends of the curd tanks.

3. An apparatus according to claim 2, wherein the first and the second portion of the pipe system each comprise a ring line, a first ring line being connected with all first outlets of said curd tanks and a second ring line being connected with all second outlets of the curd tanks.

4. An apparatus according to claim 3, wherein the ring lines each have two free ends, which are each connected via at least one curd pump with a curd processing apparatus.

5. An apparatus according to claim 4, wherein the curd discharge pipes associated with at least one of the ring lines are connected crosswise with two opposite sides of an inlet section of a curd processing apparatus.

6. An apparatus according to claim 5, wherein a curd discharge pipe associated with the first ring line terminates, together with a curd discharge pipe associated with the second ring line, in a common curd discharge pipe section which is connected with a curd processing apparatus.

7. An apparatus according to claim 4, wherein all curd discharge pipes meet in a common curd discharge pipe section, which splits into two pipe sections which terminate on opposite sides of an inlet section of a curd processing apparatus.

8. An apparatus according to claim 1, wherein at least one of the curd tanks is disposed at an inclination, such that one outlet is disposed higher than the other outlet.

9. An apparatus according to claim 1, further comprising pump control means and valve control means which effectuate that during an end phase of a pump-out cycle of a curd tank, also curd from another tank is supplied to the curd processing apparatus, such that the curd mass flow remains as constant as possible over time.

* * * * *

UNITED STATES PATENT AND TRADEMARK OFFICE
CERTIFICATE OF CORRECTION

PATENT NO.        : 7,624,677 B2                                              Page 1 of 1
APPLICATION NO.   : 11/147536
DATED             : December 1, 2009
INVENTOR(S)       : Steven Acreman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 672 days.

Signed and Sealed this

Twenty-sixth Day of October, 2010

David J. Kappos
*Director of the United States Patent and Trademark Office*